United States Patent [19]

DeMarti, Jr. et al.

[11] Patent Number: 5,034,836
[45] Date of Patent: Jul. 23, 1991

[54] MAGNETIC HEAD SUSPENSION APPARATUS FOR USE WITH A PHOTOGRAPHIC FILM

[75] Inventors: Jack C. DeMarti, Jr., Rochester; John G. Weigand, Churchville, both of N.Y.

[73] Assignee: Eastman Kodak Company, Rochester, N.Y.

[21] Appl. No.: 391,746

[22] Filed: Aug. 9, 1989

[51] Int. Cl.[5] .................. G11B 5/48; G11B 5/633; G03B 17/24; G03B 21/50
[52] U.S. Cl. .................................. 360/104; 360/3; 354/105; 352/92
[58] Field of Search .................. 352/92, 236, 37; 354/21, 105, 106; 355/40; 360/104, 3

[56] References Cited

U.S. PATENT DOCUMENTS

| | | | |
|---|---|---|---|
| 2,618,710 | 11/1952 | Camras | 360/104 |
| 2,678,357 | 5/1954 | Schuessler | 360/104 |
| 3,031,531 | 4/1962 | Thevenaz | 360/104 |
| 3,352,975 | 11/1967 | Floden | 360/104 |
| 3,452,161 | 6/1969 | Hafler | 352/37 |
| 3,981,570 | 9/1976 | Ashida et al. | 352/37 |
| 4,208,108 | 6/1980 | Amikura et al. | 360/3 |
| 4,270,853 | 6/1981 | Hatada et al. | 354/76 |
| 4,270,854 | 6/1981 | Stemme et al. | 354/76 |
| 4,500,183 | 2/1985 | Tanikawa | 354/21 |
| 4,613,911 | 9/1986 | Ohta | 360/3 |
| 4,689,696 | 8/1987 | Plummer | 358/333 |
| 4,736,215 | 4/1988 | Hudspeth et al. | 354/21 |
| 4,860,037 | 8/1989 | Harvey | 354/105 |

Primary Examiner—A. J. Heinz
Assistant Examiner—Jefferson Evans
Attorney, Agent, or Firm—Marianne J. Twait

[57] ABSTRACT

A head suspension system for use in a photofinishing operation comprises a movable support mounted for movement through an arc having a predetermined radius and a pair of magnetic head suspension assemblies each rotatably mounted on the movable support. The suspension assemblies are biased towards each other to cause surfaces of the magnetic head assemblies to engage opposite edges of a photographic film respectively. The entire system including the movable support is movable through an arc to adjust for angular variations of the film while each head suspension assembly is rotatable relative to the movable support to compensate for film width variations and film edge irregularities to insure constant orientation of the magnetic heads with respect to the film edges.

9 Claims, 3 Drawing Sheets 5,034,836

MAGNETIC HEAD SUSPENSION APPARATUS FOR USE WITH A PHOTOGRAPHIC FILM

CROSS REFERENCE TO RELATED APPLICATIONS

1. U.S. Ser. No. 522,395, entitled CAMERA APPARATUS FOR MAGNETICALLY RECORDING ON FILM, and filed Apr. 30, 1990 in the name of Douglas H. Pearson which is a continuation of U.S. Ser. No. 427,210 filed Oct. 24, 1989 now abandoned, which is a continuation of U.S. Ser. No. 282,419, filed Dec. 9, 1988, now abandoned.

2. U.S. Ser. No. 391,205, entitled MAGNETIC HEAD, SUSPENSION APPARATUS, and filed on Aug. 9, 1989 in the names of Jack C. DeMarti, Jr. and John G. Weigand.

BACKGROUND OF THE INVENTION

1. Field of The Invention

This invention relates to magnetic recording apparatus and more specifically to a magnetic head suspension and follower assembly for use in reading information from and/or recording information on photographic film during photofinishing operations.

2. Description of The Prior Art

In copending application Ser. No. 282,419 cross referenced above, there is disclosed apparatus for supporting magnetic heads in a photographic still camera for recording information useful to the customer and/or the photofinisher on a magnetic surface of a photographic film. Also, the magnetic surface may contain information recorded during film manufacture relating to film speed, emulsion type, etc.

The apparatus disclosed in application Ser. No. 282,419 includes a magnetic head mounted on a movable carriage biased to engage the edge of the film so that the head records information on a track having a constant orientation with respect to the film edge. In a photofinishing operation where it is desirable to read information from the tracks recorded in the camera to utilize such information during photofinishing, a head similarly oriented with respect to the edge is necessary to accurately read the recorded information. Also, it is desirable for the photofinisher to have the capability to record additional information relating to finishing such as printing exposure conditions, customer information, reorder information, etc.

In copending U.S. application Ser No. 391,205, filed on Aug. 9, 1989, there is disclosed magnetic head suspension apparatus for use in a photofinishing operation. The apparatus includes one head suspension assembly for reading information recorded by the manufacturer and/or the camera and a second head assembly for recording and recording information relating to photofinishing. One assembly provides lateral constraint of the film and the other is biased to urge one edge of the film into engagement with the constraining assembly and to urge the other assembly into contact with the other edge.

SUMMARY OF THE INVENTION

It is an object of the present invention to provide a head suspension apparatus capable of accurately reading information from and/or recording information on a film without constraining the film.

In accordance with the invention, a head suspension system for use in a photofinishing operation comprises a support means mounted for movement through an arc having a predetermined radius and a pair of magnetic head suspension assemblies, each of which is rotatably mounted on the support means. A biasing means causes surfaces of the suspension assemblies to engage opposite edges respectively of the film. The entire system, including the support means, is movable through an arc to adjust to angular variations of the film while each head suspension assembly is rotatable relative to the support means to compensate for film width variations and film edge irregularities to insure constant orientation of the magnetic heads with respect to the film edges. With this arrangement, each head suspension assembly is capable of accurately reading information from and/or recording information on one or more tracks along each of the film edges.

DESCRIPTION OF THE DRAWINGS

Other objects and advantages will become apparent from the following drawings wherein.

DETAILED DESCRIPTION OF THE INVENTION

Figure 1:
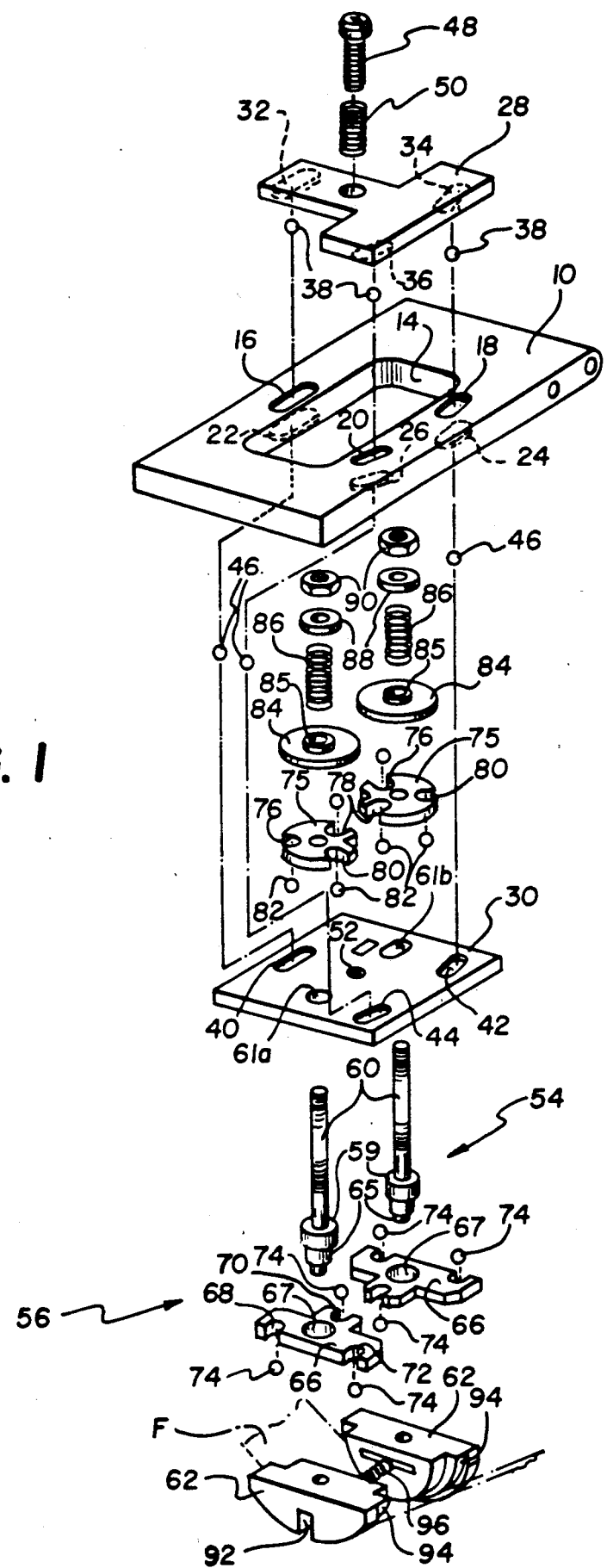
FIG. 1 is an exploded perspective view of a head suspension apparatus in accordance with the present invention.
Figure 2:
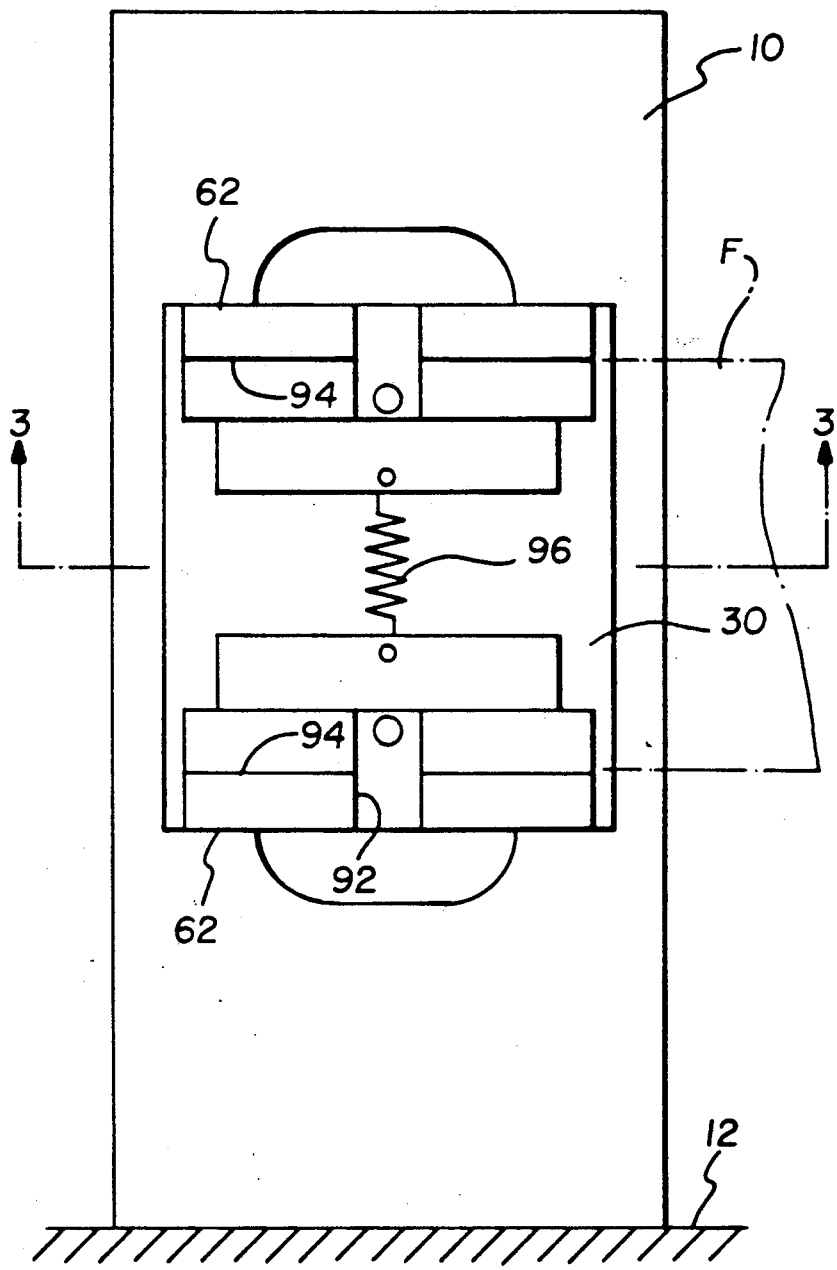
FIG. 2 is a bottom view of the head suspension apparatus shown in FIG. 1 with the heads and film removed.

Referring to the drawings and most specifically to FIG. 1, the disclosed embodiment of the head suspension apparatus for recording information on or reading information from a film F comprises a rigid rectangular supporting plate 10 fixedly attached to and extending from a suitable supporting structure 12 as schematically illustrated in FIG. 2. The plate 10 is provided with a generally rectangular central opening 14 and three elongated spaced blind slots 16, 18 and 20 in its upper surface and three identically spaced blind slots 22, 24 and 26 in its lower surface. The slots 16 and 22 are generally parallel to the edge of opening 14 while the slots 18, 20, 24 and 26 are slightly angled relative to the opposite edge of opening 14, the slots 18 and 24 being angled in one direction relative to the centerline of the film F and the slots 20 and 26 being angled in the opposite direction relative to the film centerline. The angle of the slots will depend on the system with which the head suspension apparatus is used.

A pair of bearing plates 28 and 30 are positioned on opposite sides of the plate 10. The upper plate 28 is provided with three slots 32, 34 and 36 aligned with the slots 16, 18 and 20 respectively in the plate 10. Three bearing balls 38 are positioned between the plates 28 and 10 and are received by the aligned slots to provide for rotation of the plate 28 relative to the fixed plate 10.

Similarly, the lower plate 30 is provided with three slots 40, 42 and 44 aligned with the lower slots 22, 24 and 26 respectively in the lower surface of plate 10. Three bearing balls 46 are positioned between the plates 10 and 30 and are received by the aligned slots to provide for rotation of the plate 30 relative to the plate 10. The assembly comprising plates 28 and 30, balls 38 and 46, is resiliently clamped together by a bolt 48 and a retaining spring 50, the bolt 48 being threaded into opening 52 of plate 30. As will later be described in more detail, the plates 28 and 30 function as a carriage which translates as a unit through an arc about a virtual pivot point defined by the inclination of slots 18, 20, 24 and 26 to allow the head suspension apparatus to adjust to angular variations of the film F with respect to supporting structure 12.

Figure 3:
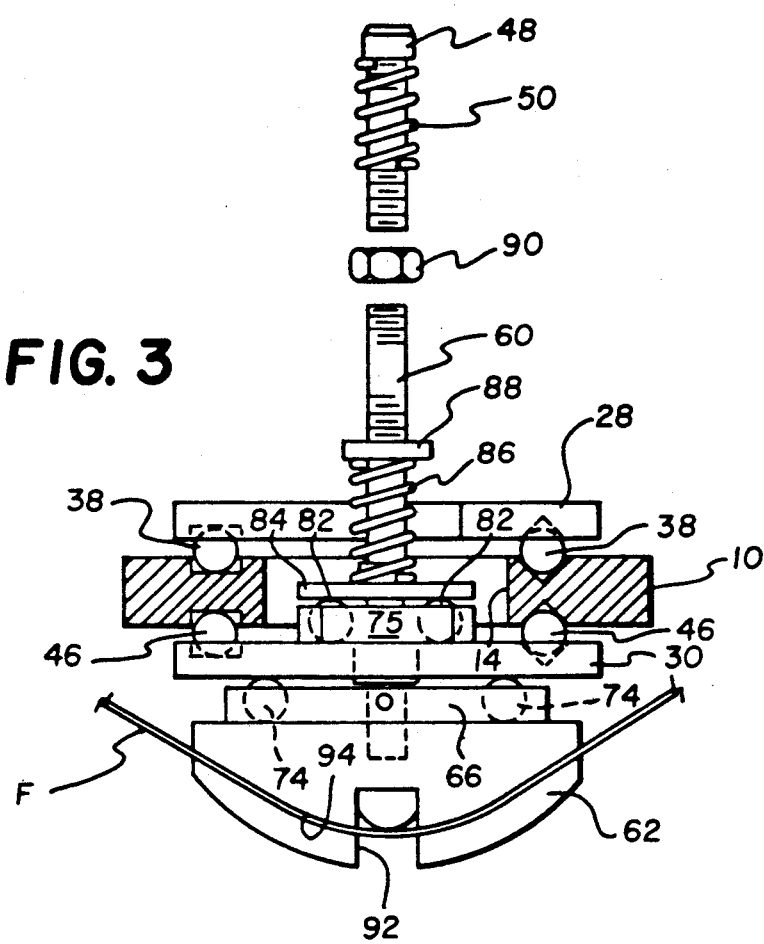
FIG. 3 is a section taken along the line 3—3 of FIG. 2.

A pair of head suspension assemblies identified generally by the reference numerals 54 and 56 are supported on the lower plate 30 to read information from and record information on the magnetic surface of film F. The two head suspension assemblies 54 and 56 are generally identical and their parts are designated by like reference numerals except where a difference exists. Each assembly comprises an elongated shaft 60 extending through opening 14 and having a bearing 59 journaled into an opening 61 in the lower movable plate 30. Each shaft 60 has its lower end attached to a mount 62 for a magnetic head 64. Also, each shaft is provided with a bearing surface 65 journaled in an opening 67 of a ball retainer 66. The retainer 66 is provided with three additional openings 68, 70 and 72 for receiving three bearing balls 74 which engage the lower surface of the plate 30 and upper surface of mounts 62 as shown most clearly in FIG. 3.

Each shaft 60 is provided with an upper ball retainer 75 above the plate 30 which is also provided with three openings 76, 78 and 80 for receiving three bearing balls 82 which engage the upper surface of plate 30. A ball retaining washer 84 having a spring centering rim 85 is positioned on each shaft 60 above the retainer 75. Each assembly comprising retainers 66 and 75 and balls 74 and 82 are resiliently held together by a spring 86 positioned on each shaft 60 and retained by a washer 88 and a lock nut 90.

With this arrangement, each of the head suspension assemblies is rotatable relative to the plate 30 by the rolling contact of the balls 74 and 82 with the upper and lower surfaces of the plate 30. Thus each head mount 62 is rotatable about the axis of its respective shaft 60.

Each of the head mounts 62 is provided with a recess 92 for receiving at least one magnetic head and a recess 94 defining a surface adapted to be engaged by the film during its transport over the head mounts. A spring 96 is connected between the head mounts 62 to bias assembly 54 toward assembly 56 as will now be described.

The openings 61 separately identified as 61a and 61b permit relative movement of the two shafts 60 and thus the two head suspension assemblies 54 and 56. More specifically, opening 61a is circular and provides constraint against movement of its associated shaft 60 relative to the centerline of the film. This causes the mount 62 of head suspension assembly 56 to act as a stop which locates the entire suspension apparatus relative to the position of the film F. Opening 61b on the other hand is elongated perpendicular to the centerline of the film to permit shaft 60 and the assembly 54 to move relative to the centerline of the film. With this arrangement, the spring 96 biases the head suspension assembly 54 toward the film centerline to urge its associated mount 62 into engagement with the film edge and also to urge the mount 62 of assembly 56 into engagement with the film F.

Figure 4:
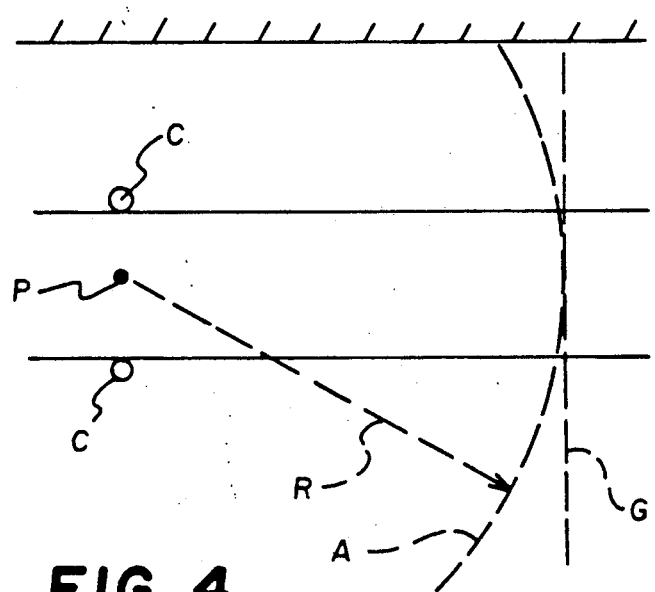
FIG. 4 is a diagram illustrating the operation of the disclosed embodiment.

In operation, each of the head suspension assemblies is free to rotate relative to the plate 30 to compensate for film width variations and film edge irregularities. Spring 96 insures contact of the head mounts with the film edges to maintain orientation of the heads with the film edges. Referring to FIG. 4 where the head gap centerline is indicated by line G, the movement path of the head suspension apparatus is indicated by curved line A, and the closest up stream lateral film constraint are edge guides C. Thus, any angular displacement of the film will constitute pivotal movement about point P between the constraints C. It is therefore desirable that the entire assembly, including both head suspension assemblies, be allowed to translate through an arc about a virtual pivot point coinciding with point P to allow the assembly to self adjust to angular position variations of the film with respect to supporting structure 12. The radius of the pivot arc A will thus correspond to the distance from the centerline of upstream constraints C of the film to the centerline of the magnetic heads and thus the radius of angular displacement of the film. This radius is achieved by selecting appropriate inclinations of slots 18, 20, 24 and 26 relative to the film centerline.

It will thus be apparent that, the entire apparatus including the magnetic head will translate through an arc having the same radius as the angular film displacement relative to structure 12 to accurately compensate for such film displacement. The permitted motion of the two head suspension assemblies and the permitted motion of the entire assembly relative to the film combine to essentially provide a zero lateral constraint film follower assembly.

While the invention has been shown and described with reference to a preferred embodiment thereof, it will be apparent that various changes may be made without departing from the scope of the invention as defined by the appended claims.

We claim:

1. Apparatus for reading and/or writing information on a magnetic surface of a photographic film, said apparatus comprising:
    a fixed support means;
    a movable support means;
    means for mounting said movable support means on said fixed support means for movement through an arc having a predetermined radius corresponding to a radius of angular displacement of a photographic film;
    a pair of spaced magnetic head suspension assemblies have surfaces for engaging opposite longitudinal edges of a photographic film;
    means for rotatably supporting said magnetic head suspension assemblies on said movable support; and
    means for supporting one of said magnetic head suspension assemblies for movement relative to another of said magnetic head suspension assemblies.

2. Apparatus as claimed in claim 1 further including means for biasing said one magnetic head suspension assembly toward the other magnetic head suspension assembly to urge said surfaces into engagement with the longitudinal edges of a photographic film.

3. Apparatus as claimed in claim 2 wherein said biasing means comprises a spring extending between said assemblies for urging said magnetic head suspension assemblies toward each other.

4. Apparatus as claimed in claim 3 wherein said fixed support means comprises a fixed plate and said movable support means comprises a pair of movable plates positioned on opposite sides of said fixed plate.

5. Apparatus as claimed in claim 4 wherein said mounting means comprises a plurality of slots positioned on opposite surfaces of said fixed support plate;

a plurality of complimental slots formed in the surfaces of said movable plates, said complimental slots positioned in opposing relationship to said slots on said fixed plate; and a plurality of bearing balls positioned in said slots respectively.

6. Apparatus as claimed in claim 5 wherein two of said slots in each of said movable plates are inclined relative to a longitudinal centerline of a photographic film to establish the radius of said arc.

7. Apparatus as claimed in claim 6 wherein each of said magnetic head suspension assemblies comprises;

an elongated shaft rotatably positioned through an opening in one of said movable plates;

a pair of bearing retainers each having a plurality of openings positioned on said shaft on opposite sides of said one movable plate;

a plurality of bearing balls positioned in said openings to engage said movable plate; and a magnetic head mount attached to one of said bearing retainers.

8. Apparatus as claimed in claim 7 wherein said magnetic head mount has a recess to define said surface for engaging the edge of a photographic film.

9. Apparatus as claimed in claim 8 wherein said spring is mounted between said head mounts.

* * * * *